United States Patent [19]

Koshimizu

[11] Patent Number: 5,046,399
[45] Date of Patent: Sep. 10, 1991

[54] TANDEM TYPE BRAKE BOOSTER

[75] Inventor: Naganori Koshimizu, Yamanashi, Japan

[73] Assignee: Tikico Ltd., Kanagawa, Japan

[21] Appl. No.: 433,772

[22] Filed: Nov. 9, 1989

[30] Foreign Application Priority Data

Nov. 11, 1988 [JP] Japan ............... 63-147371[U]

[51] Int. Cl.$^5$ .................................... F15B 9/10
[52] U.S. Cl. .................... 91/369.3; 91/376 R
[58] Field of Search ............ 91/369.1, 369.2, 369.3, 91/376 R; 92/96, 98 R

[56] References Cited

U.S. PATENT DOCUMENTS

| 3,688,647 | 9/1972 | Kytta | 91/376 R |
|---|---|---|---|
| 3,754,450 | 8/1973 | Putt et al. | 91/369.2 |
| 3,897,718 | 8/1975 | Gardner et al. | 91/376 R |
| 4,257,312 | 2/1981 | Ohmi et al. | 91/369.3 |
| 4,348,944 | 9/1982 | Ochiai | 91/369.3 |
| 4,542,680 | 9/1985 | Takeuchi | 91/369.2 |
| 4,590,845 | 5/1986 | Tateoka et al. | 91/369.2 |
| 4,729,287 | 3/1988 | Boehm et al. | 91/369.2 |

FOREIGN PATENT DOCUMENTS 51-116392 3/1950 Japan .
53-23913 7/1978 Japan .
57-46206 10/1982 Japan .

Primary Examiner—Edward K. Look
Assistant Examiner—F. Daniel Lopez
Attorney, Agent, or Firm—Wenderoth, Lind & Ponack

[57] ABSTRACT

A tandem type brake booster is disclosed which comprises a booster body, a partitioning wall partitioning the interior of the body into front and rear chambers, a valve body axially movably disposed in the body, front and rear power pistons provided with respective diaphragms associated therwith and respectively dividing the interior of the front and rear chambers into respective constant and variable pressure chambers, a plunger axially movably disposed in the valve body, and a valve mechanism disposed in the valve body to selectively introduce atmospheric air and negative pressure into the variable pressure chambers. The valve body includes a large diameter portion on which the front and rear power pistons are secured and a small diameter portion, the large diameter portion being provided adjacent to the rear end thereof with a slightly reduced diameter stepped portion, the small diameter portion being provided with a circumferentially extending groove. The booster further comprises a retainer mounted on the valve body and having an engaging portion for engaging with the groove to fix the retainer to the valve body and a retaining portion for fixedly retaining the inner circumference portions of the rear power piston and the diaphragm together and onto the stepped portion and detent means on the valve body and on the retainer for preventing the retainer from rotating relative to the valve body.

19 Claims, 3 Drawing Sheets

TANDEM TYPE BRAKE BOOSTER

BACKGROUND OF THE INVENTION

1. Field of the Invention

The present invention relates to a tandem type brake booster for use in the brake system of a vehicle such as an automobile, and particularly relates to a tandem type brake booster in which a rear power piston and a diaphragm associated therewith are designed to be reliably and firmly fixed to the valve body of the booster.

2. Description of the Prior Art

Recently, there has been a tendency for the engine of an automobile to be so designed as to operate at a higher speed and to output a higher power, and, corresponding to this tendency, many automobiles are provided with a brake booster designed to boost the force applied to the brake pedal by utilizing, for example, negative pressure in the intake manifold of the engine and to output the boosted force to the master cylinder. In the case where a relatively higher output is required, there is employed a tandem type brake booster in which two power pistons are arranged to work in tandem.

The following are conventional well-known arrangements in a brake booster design for securing a power piston and a diaphragm associated thereto to the valve body of the booster.

Japanese Patent Publication (Kokoku) No. 23913/78 which corresponds to U.S. Pat. No. 3,897,718 discloses, in FIGS. 2 and 3, a booster in which the valve body is provided with a groove formed on the outer periphery thereof and extending circumferentially thereabout. The groove is designed to receive therein the inner circumference portion of a rear power piston and a bead portion formed adjacent to the inner circumference portion of a diaphragm. The groove is further designed to receive a retainer or an additional ring which fits in the groove behind the diaphragm to fix the rear power piston and diaphragm to the valve body.

The above arrangement for securing a power piston and a diaphragm to a valve body suffers, however, from the following problems. In the arrangement, the retainer or the additional ring is fitted in the same groove as the rear power piston and the diaphragm are fitted in. The retainer or the additional ring therefore becomes loose in the groove and it is further possible for it to come out of the groove when the diaphragm is excessively deformed due to the pressure acting thereon or elastic force of the diagram is reduced by virtue of deterioration thereof with age.

Japanese Utility Model Public Disclosure (Kokai) No. 116392/76 discloses another arrangement in which a power piston is formed integrally with the valve body and a diaphragm is secured to the valve body with a bead portion thereof being fastened between the valve body and a retainer held on the valve body by a stop key. In most boosters, the valve body is usually provided with a passage for selectively introducing atmospheric air and negative pressure into a variable pressure chamber. This passage cannot however be utilized for the aforementioned stop key. Therefore, a separate hole for the stop key must be formed in the valve body.

SUMMARY OF THE INVENTION

In the view of the above-mentioned problems of the prior art, it is a primary object of the present invention to provide a tandem type brake booster in which the power piston and the diaphragm associated therewith are reliably and fixedly secured to the valve body.

To this end, the present invention provides a tandem type brake booster comprising a booster body consisting of a front sheel and a rear shell, the interior of the booster body being divided into front and rear chambers by a partitioning wall provided therein. A valve body is disposed in the booster body to axially movably extend through the partitioning wall, the rear end of the valve body extending through the rear shell to the outside of the booster body. A front power piston is disposed in the front chamber and is provided with a front diaphragm for dividing the front chamber into a front constant pressure chamber and a front variable pressure chamber, the front power piston and the front diaphragm being secured together at the respective inner circumference portions to the valve body. A rear power piston is disposed in the rear chamber and is provided with a rear diaphragm for dividing the rear chamber into a rear constant pressure chamber and a rear variable pressure chamber, the rear power piston and the rear diaphragm being secured together at the respective inner circumference portions to the valve body. A plunger is disposed to be axially slidable in a bore formed in the valve body, the plunger being connected to an input shaft. A valve mechanism is disposed in the bore of the valve body, the plunger cooperating with the valve mechanism to control the selective introduction of atmospheric air and negative pressure into the front and rear variable pressure chambers. The valve body includes a large diameter portion on which the front and rear power pistons are secured and a small diameter portion connected to the large diameter portion through a shoulder formed therebetween and accommodating the valve mechanism therein. The large diameter portion is provided adjacent to the rear end thereof with a stepped portion having a slightly reduced diameter, and the small diameter portion is provided with a groove formed in the outer surface thereof and extending circumferentially thereabout. The booster further comprises a retainer mounted on the valve body and having an engaging portion for engaging with the groove of the small diameter portion to fix the retainer to the valve body and a retaining portion for fixedly retaining the inner circumference portions of the rear power piston and rear diaphragm together onto the stepped portion of the large diameter portion, and detent means on the valve body and on the retainer for preventing the retainer from rotating relative to the valve body.

The above and other objects, features and advantages of the present invention will become apparent from the following description of the preferred embodiments thereof, taken in conjunction with the accompanying drawings.

DETAILED DESCRIPTION OF THE PREFERRED EMBODIMENTS

Figure 1:
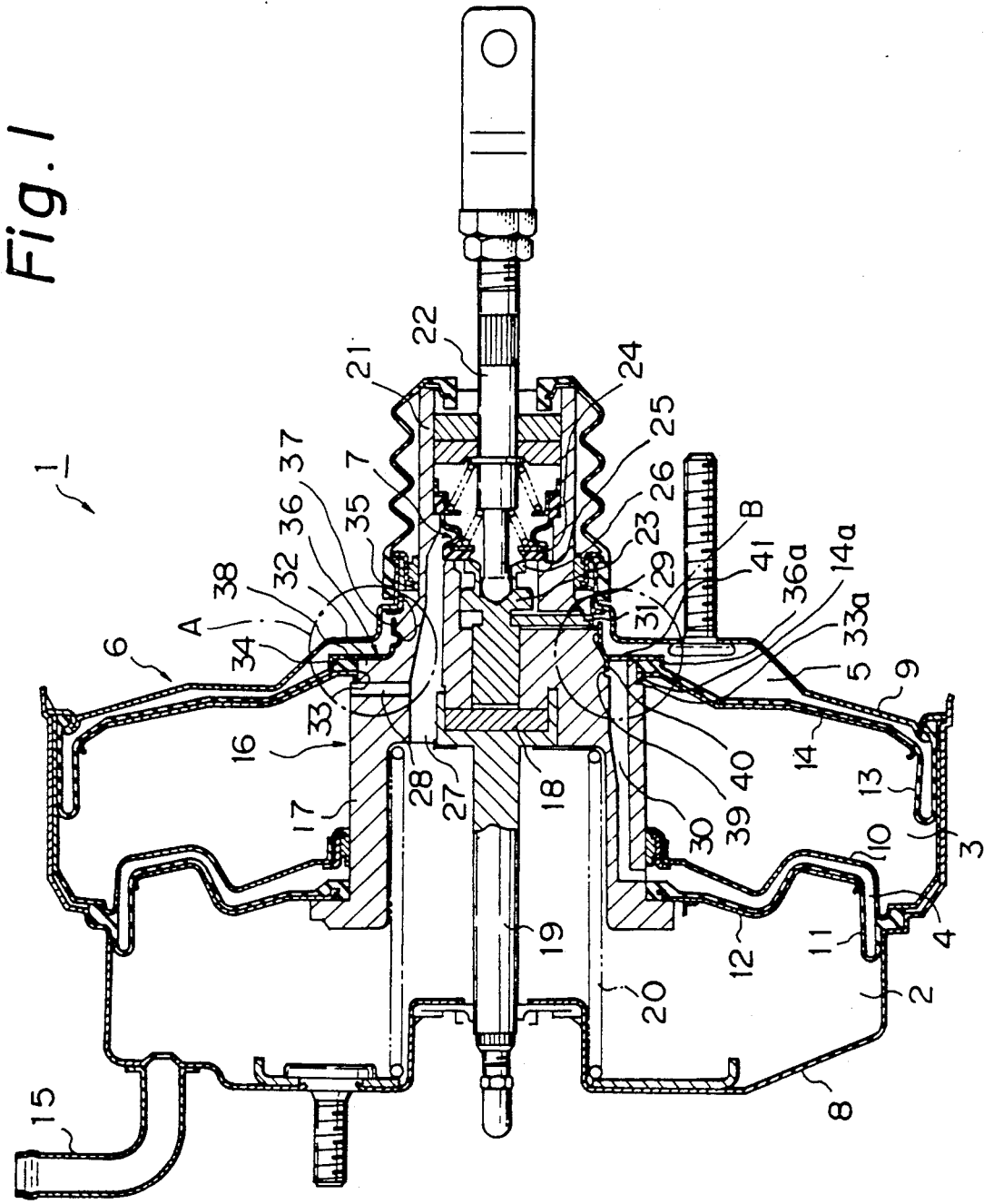
FIG. 1 is a section of view of a brake booster according to the present invention.

Referring to FIG. 1, a first embodiment of the invention will be explained.

A tandem type brake booster 1 shown in FIG. 1 includes a booster body or housing 6 having front and rear constant pressure chambers 2 and 3, respectively, and front and rear variable pressure chambers 4 and 5, respectively, defined therein and a valve mechanism 7 for selectively introducing negative pressure and atmospheric air into the respective variable pressure chambers 4 and 5.

The booster body 6 consists of a front shell 8, a rear shell 9 and a center plate (or partitioning wall) 10 having a central hole for receipt of a valve body 16. Those three members are deformed at their outer peripheral portions to be fixed to each other so that the interior of the body 6 is partitioned into front and rear chambers (the left and right ones in the FIG. 1 are referred to as front and rear chambers, respectively). The front chamber is further partitioned into the front constant pressure chamber 2 and the front variable pressure chamber 4 by means of a front power piston 12 provided wuth a front diaphragm 11 while the rear chamber is partitioned into the rear constant pressure chamber 3 and the rear variable pressure chamber 5 by means of a rear power piston 14 provided with a rear diaphragm 13. On the front shell 8 is mounted a negative pressure introducing tube 15 for connecting the front constant pressure chamber 2 to a negative pressure source such as the intake manifold of the engine (not shown).

The front and rear power pistons 12 and 14 are secured to a larger diameter portion or securing portion 17 of the valve body 16 which is mounted movably forward and backward in the booster body 6. An output shaft 19 is connected to the valve body 16 through a reaction disc 18. A return spring 20 is interposed between the front shell 8 and the valve body 16 to constantly apply a force to the valve body for biasing the front and rear power piston 12 and 14 backward.

The valve body also comprises a rear portion or smaller diameter tubular portion 21 extending to the outside of the booster body 6. A plunger 23 connected to an input shaft 22 is slidably disposed in the tubular portion 21. A poppet valve 24 is also disposed on the inner peripheral surface of the valve body 16 for seating on and seaparating from valve seats 25 and 26 respectively formed on the inner surface of the valve body 16 and the rear end of the plunger 23.

A passage 27 is formed in the valve body 16 for communicating the front constant pressure chamber 2 with the inside of the valve body 16, and another passage 28 branches off the passage 27 at an intermediate point thereof for communicating with the rear constant pressure chamber 3. The valve body 16 is also provided with a passage 29 formed therein for communicating the inside of the valve body 16 with the rear variable pressure chamber 5 and an atmospheric passage 30 for communicating the front and rear variable chambers 4 and 5 to each other. A stop key 31 is inserted through the passage 29 with a clearance therebetween with the inner end thereof fitting into a groove formed in the outer surface of the plunger 23. The outer end of the stop key 31 is engageable with a portion of the rear shell, as shown in FIG. 1, so that the stop key functions to define the final position of the plunger 23 in the returning operation of the booster 1.

Next, there will be given an explanation of the constitution of the present invention relating to securing the rear power piston 14 and the rear diaphragm 13 to the valve body 16.

As mentioned before, the valve body 16 includes the larger diameter portion 17 to which the power piston 12 and 14 are mounted and the smaller diameter tubular portion 21 within which the valve mechanism 7 is disposed. Between the larger diameter portion 17 and the tubular portion 21 is formed a shoulder portion 32. A slightly reduced diameter portion or stepped portion 33 is formed adjacent the rear end of the larger diameter or securing portion 17. On the stepped portion 33 are fitted the inner circumference of the rear power piston 14 and the inner circumference of a bead portion 34 formed adjacent the inner side of the diaphragm 13 which is associated with and overlaid on the power piston 14. The rear power piston 14 is provided with a short tubular portion 14a formed on the inner circumference thereof and extending forward. The forward end of the short tubular portion 14a is adapted to abut on a shoulder 33a extending radially at the forward end of the stepped portion 33.

In the outer surface of the smaller diameter tubular portion 21 of the valve body is formed a groove 35 extending circumferentially thereabout. Reference numeral 36 denotes a retainer which includes a tubular portion 37 and a first flat flange portion 38 extending radially outwardly from the forward end of the tubular portion 37. The tubular portion 37 fits on the valve body tubular portion 21. Several circumferentially spaced portions 44 of the tubular portion 37 are deformed to protrude into the groove 35. Thus, the retainer 36 is fixed to the smaller diameter tubular portion 21 of the valve body 16 and is prevented from moving relative to the valve body 16 in the axial direction. The front surface of the flange portion 38 abuts against and extends beyond the shoulder portion 32. As shown, the flange portion 38 cooperates with the shoulder portion 33a to compressively clamp the inner circumference portion of the rear power piston 14 and the bead portion 34 of the diaphragm 13 therebetween with the forward end of the short tubular portion 14a abutting on the shoulder portion 33a, so that the rear power piston 14 and the diaphragm 13 are firmly fixed to the stepped portion 33 of the valve body 16. The retainer 36 is also provided with a second short tubular portion 36a extending forward from the outer circumference of the flange portion 38. The second tubular portion 36a fits on the outer circumference of the bead portion 34 of the diaphragm 13 and prevents the material of the bead portion 34 from escaping outward when the rear power piston 14 and the diaphragm 13 are compressively clamped. Thus, the second tubular portion 36a functions to improve the clamping operation by the flange portion 38 and the shoulder 33a.

The passage 30 formed in the valve body 16 for communicating the front and rear variable pressure chamber 4 and 5 with each other opens through the surface of the shoulder portion 32 to the rear variable pressure chamber 5. A planar portion 39 is formed in the wall of the passage 30 adjacent to the opening, and a projection 40 formed by partially lancing and bending a portion of the retainer 36 corresponding to the planar portion 39 is inserted into the passage 30 and engaged with the planar portion 39 to prevent the retainer 36 from rotating relative to the valve body 16. A hole 41 is formed by forming the projection 40. Thus, the retainer 36 does not close the passage 30.

As can be clearly understood from the above explanation, the retainer 36 does not become loose in the groove 35 and does not come out of the groove 35 due to a deformation of the diaphragm 13 or deterioration of the diaphragm 13 with age. The rear power piston 14 and the diaphragm 13 can therefore be reliably and firmly fixed to the valve body 16.

As shown in FIG. 1, the tubular portion 37 of the retainer may be extended rearward under the stop key 31 so as to prevent the stop key 31 from coming out of the passage 29.

Figure 2:
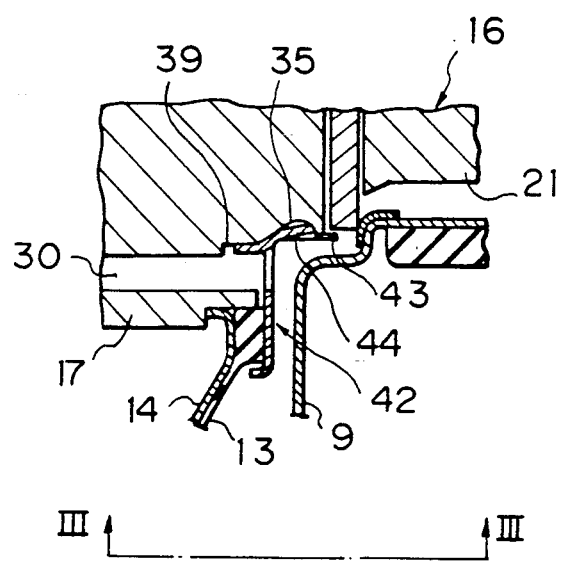
FIG. 2 is a sectional view of an main portion of a alternative embodiment.
Figure 3:
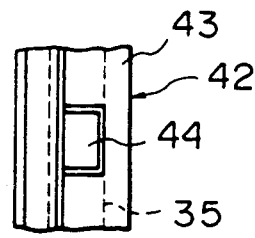
FIG. 3 is a partial side elevation view taken along the line III—III in FIG. 2.
Figure 4:
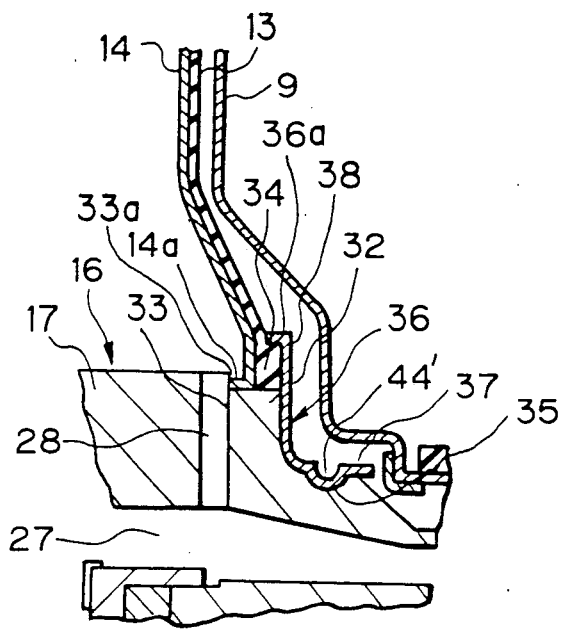
FIG. 4 is an enlarged detail view of a portion A of FIG. 1.
Figure 5:
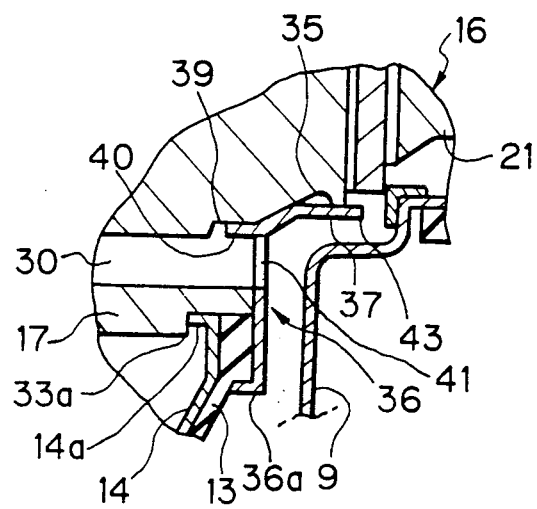
FIG. 5 is an enlarged detail view of a portion B of FIG. 1.

Referring to FIGS. 2 and 3, a second embodiment of the invention will be explained. Since this embodiment is only different from the first embodiment explained above in its arrangement for connecting a retainer to an annular groove formed in a valve body and the other parts are the same, only an explanation of this different arrangement will be given and that of the other parts will be omitted.

In the first embodiment, the retainer 36 is secured to the valve body 16 by deforming the tubular portion 37 of the retainer so that deformed portions 44 protrude into the groove 35 formed in the tubular portion 37. The present second embodiment, however, employs a retainer 42' having a tubular portion 43' provided with a plurality of claws 44' formed thereon and circumferentially spaced apart from each other. These claws 44' are formed to extend backwardly and radially inwardly so that tips of the claws engage with the groove 35 formed in the outer circumference of the tubular portion 37 of the valve body 16. Elasticity of the bead portion 34 of the diaphragm 13 prevents the retainer 42' from axially rattling relative to the valve body 16.

A brief explanation will now be given of the operation of the brake booster with the constitution explained above.

When the brake pedal is not depressed, the front and rear constant pressure chambers 2 and 3 communicate with each other through the passages 27 and 28 and the front constant pressure chamber 2 is connected to the negative pressure source through the negative pressure introducing tube 15, thus both chambers 2, 3 being under negative pressure.

When the brake pedal is depressed to move the input shaft forwardly, the plunger 23 advances relative to the valve body so that the poppet valve 24 separates from the valve seat 25 of the plunger, thereby introducing atmospheric air into the rear variable pressure chamber 5 through the passage 29. Atmospheric air is further introduced into the front variable pressure chamber 4 through the passage 30. Thus, a pressure difference is generated between the front constant pressure and the front variable pressure chambers 2 and 4, respectively, and between the rear constant pressure and front variable pressure chambers 3 and 5, respectively, so that the front power piston 12 and the rear power piston 14 are both advanced. At that time, the valve body 16 is also advanced to transmit a boosted thrust force to the output shaft 19.

When the brake pedal is released, the plunger 23 moves backward relative to the valve body 16 so that the poppet valve 24 separates from the valve seat 26 of the valve body 16 while it seats on the valve seat 25 of the plunger 23. Thus, introduction of atmospheric air into the variable pressure chambers 4, 5 is prevented while the constant pressure chambers 2 and 3 re-pec-tively communicate with the variable pressure chambers 4 and 5 through the passages 29 and 30 in the valve body 16, so that the pressure difference having been generated between the respective associated chambers decreases and the return spring 20 returns the power pistons 12 and 14 to their respective initial positions.

In the embodiments mentioned above, the groove 35 is formed to extend annularly around the tubular portions 21 of the valve body 16. The groove 35 may however comprise a plurality of grooves circumferentially spaced apart from each other and the tubular portion 37 of the retainer 36 may be deformed at the portions respectively aligning with the plurality of grooves to protrude into the grooves. In this case, the engagement of the protruded portions of the retainer with the grooves acts not only to prevent the axial movement of the retainer 36 relative to the valve body 16 but also to prevent the rotational movement of the retainer 36 relative to the valve body 16 together with the engagement of the projection 40 with the planar portion 39, thereby more reliably preventing the rotation of the retainer 36. As explained above, in a brake booster according to the present invention, a rear power piston and a diaphragm associated therewith are fitted on a stepped portion formed on a valve body and fixedly secured thereto by a retainer which is secured to an annular groove formed on another portion of the valve body separated from the stepped portion and which is prevented from rotating relative to the valve body. The power piston and the diaphragm can therefore be reliably and firmly fixed to the valve body. Further, the retainer is firmly held on the valve body and is prevented from coming out of the valve body due to deterioration of the diaphragm with age or due to excessive deformation of the diaphragm in use.

What is claimed is:

1. A tandem type brake booster comprising:
   a booster body including a front shell and a rear shell;
   a partitioning wall mounted in an interior of said booster body and dividing said interior of said booster body into front and rear chambers, said partitioning wall having a center hole formed therein;
   a valve body extending axially movably through said center hole of said partitioning wall, said valve body having a bore formed therein and being mounted in said booster body with a rear end of said valve body extending outwardly of said booster body through said rear shell, said valve body having a large diameter portion with a stepped portion which is smaller in diameter than a remainder of said large diameter portion and which is located adjacent a rear end of said large diameter portion, a small diameter portion smaller in diameter than said stepped portion and including a groove formed at least partially circumferentially about an outer surface of said small diameter portion, and a shoulder portion connecting said large diameter portion to said small diameter portion;
   a front power piston mounted in said front chamber;
   a rear power piston mounted in said rear chamber;
   a front diaphragm mounted in said front chamber and dividing said front chamber into a front constant pressure chamber and a front variable pressure chamber, said front diaphragm and said front power piston having inner circumferential portions secured together and to said valve body;

a rear diaphragm mounted in said rear chamber and dividing said rear chamber into rear constant pressure chamber and a rear variable pressure chamber, said rear diaphragm and said rear power piston having inner circumferential portions secured together and to said valve body;

an input shaft having front and rear ends;

a plunger operatively connected to said front end of said input shaft and being axially slidably mounted in said bore of said valve body;

a valve means, disposed in said bore of said valve body and cooperating with said plunger, for selectively controlling introduction of atmospheric air and negative pressure into said front and rear variable pressure chambers;

a passage formed in said valve body and communicating between said front variable pressure chamber and said rear variable pressure chamber, said passage opening through a surface of said shoulder portion and into said rear variable pressure chamber; and a retainer mounted on said valve body and including an engaging means for engaging in said groove of said small diameter portion and fixing said retainer to said valve body, a retaining means for securing said inner circumferential portions of said rear diaphragm and said rear power piston together and to said stepped portion of said large diameter portion, and a detent means, comprising a portion of said retaining projecting into said passage, for preventing said retainer from rotating relative to said valve body.

2. A tandem type brake booster as recited in claim 1, wherein said engaging means of said retainer comprises a tubular portion of said retainer which is fitted about a portion of said small diameter portion and which has at least one deformed portion protruding into said groove of said small diameter portion.

3. A tandem type brake booster as recited in claim 2, wherein said valve body further comprises a second shoulder portion formed between said large diameter portion and said stepped portion; and said retaining means of said retainer comprises a flat flange portion of said retainer which clamps said rear diaphragm and said inner circumferential portions of said rear power piston against said second shoulder of said valve body.

4. A tandem type brake booster as recited in claim 3, wherein said rear diaphragm further includes an annular bead portion at said inner circumferential portion thereof; and said retainer further comprises a means, comprising a second tubular portion extending from an outer periphery of said flat flange portion and fitted about an outer periphery of said bead portion of said rear diaphragm, for preventing the material of said bead portion from flowing radially outwardly when clamped between said flat flange portion and said second shoulder.

5. A tandem type brake booster as recited in claim 2, wherein said small diameter portion of said valve body has a radially extending hole formed therein; and a stop means is provided for limiting rearward movement of said plunger, said stop means comprising a stop key adapted to be inserted in said radially extending hole such that a first end of said stop key engages with said plunger and a second end of said stop key abuts against said rear shell.

6. A tandem type brake booster as recited in claim 5, wherein said tubular portion of said retainer is positioned radially outwardly of said second end of said stop key to prevent said stop key from moving radially outwardly out of said radially extending hole.

7. A tandem type brake booster as recited in claim 2, wherein said at least one deformed portion comprises a convex-shaped portion, 8. A tandem type brake booster as recited in claim 2, wherein said at least one deformed portion comprises a cut and radially inwardly bent claw portion of said retainer.

9. A tandem type brake booster as recited in claim 1, wherein said groove is formed as discrete groove segments spaced circumferentially about said small diameter portion of said valve body; and said engaging means of said retainer is further operable for preventing rotation of said retainer relative to said valve body and comprises a tubular portion of said retainer fitted about a portion of said small diameter portion and having discrete deformed portions respectively aligned with and protruding into said discrete groove segments of said small diameter portion.

10. A tandem type brake booster as recited in claim 9, wherein said valve body further comprises a second shoulder portion formed between said large diameter portion and said stepped portion; and said retaining means of said retainer comprises a flat flange portion of said retainer which clamps said rear diaphragm and said inner circumferential portions of said rear power piston against said second shoulder of said valve body.

11. A tandem type brake booster as recited in claim 10, wherein said rear diaphragm further includes an annular bead portion at said inner circumferential portion thereof; and said retainer further comprises a means, comprising a second tubular portion extending from an outer periphery of said flat flange portion and fitted about an outer periphery of said bead portion of said rear diaphragm, for preventing the material of said bead portion from flowing radially outwardly when clamped between said flat flange portion and said second shoulder.

12. A tandem type brake booster as recited in claim 9, wherein said small diameter portion of said valve body has a radially extending hole formed therein; and a stop means is provided for limiting rearward movement of said plunger, said stop means comprising a stop key adapted to be inserted in said radially extending hole such that a first end of said stop key engages with said plunger and a second end of said stop key abuts against said rear shell.

13. A tandem type brake booster as recited in claim 12, wherein said tubular portion of said retainer is positioned radially outwardly of said second end fo said stop key to prevent said stop key from moving radially outwardly out of said radially extending hole.

14. A tandem type brake booster as recited in claim 9, wherein
said at least one deformed portion comprises a convex-shaped portion.

15. A tandem type brake booster as recited in claim 9, wherein
said at least one deformed portion comprises a cut and radially inwardly bent claw portion of said retainer.

16. A tandem type brake booster comprising:
a booster body including a front shell and a rear shell;
a partitioning wall mounted in an interior of said booster body and dividing said interior of said booster body into front and rear chambers, said partitioning wall having a center hole formed therein;
a valve body extending axially movably through said center hole of said partitioning wall, said valve body having a bore formed therein and being mounted in said booster body with a rear end of said valve body extending outwardly of said booster body through said rear shell, said valve body having a large diameter portion with a stepped portion which is smaller in diameter than a remainder of said large diameter portion and which is located adjacent a rear end of said large diameter portion, a small diameter portion smaller in diameter than said stepped portion and including a radially extending hole formed therein and a groove formed at least partially circumferentially about an outer surface of said small diameter portion, and a shoulder portion connecting said large diameter portion to said small diameter portion
a front power piston mounted in said front chamber;
a rear power piston mounted in said rear chamber;
a front diaphragm mounted in said front chamber and dividing said front chamber into a front constant pressure chamber and a front variable pressure chamber, said front diaphragm and said front power piston having inner circumferential portions secured together and to said valve body;
a rear diaphragm mounted in said rear chamber and dividing said rear chamber into a rear constant pressure chamber and a rear variable pressure chamber, sad rear diaphragm and said rear power piston having inner circumferential portion secured together and to said valve body;
an input shaft having front and rear ends;
a plunger operatively connected to said front end of said input shaft and being axially slidably mounted in said bore of said valve body;
a valve means, disposed in said bore of said valve body and cooperating with said plunger, for selectively controlling introduction of atmospheric air and negative pressure into said front and rear variable pressure chambers;
a retainer mounted on said valve body and including an engaging means for engaging in said groove of said small diameter portion and fixing and retainer to said valve body, a retaining means for securing said inner circumferential portions of said rear diaphragm and said rear power piston together and to said stepped portion of said large diameter portion, and a detent means for preventing said retainer from rotating relative to said valve body;
stop means for limiting rearward movement of said plunger, said stop means comprising a stop key adapted to be inserted in said radially extending hole such that a first end of said stop key engages with said plunger and a second end of said stop key abuts against said rear shell wherein said tubular portion of said retainer is positioned radially outwardly of said second end of said stop key to prevent said stop key from moving radially outwardly out of said radially extending hole.

17. A tandem type brake booster as recited in claim 16, wherein
said engaging means of said retainer comprises a tubular portion of said retainer which is fitted about a portion of said small diameter portion which has at least one deformed portion protruding into said groove of said small diameter portion.

18. A tandem type brake booster as recited in claim 17, wherein
said valve body further comprises a second shoulder portion formed between said large diameter portion and said stepped portion; and
said retaining means of said retainer comprises a flat flange portion of said retainer which clamps said rear diaphragm and said inner circumferential portions of said rear power piston against said second shoulder of said valve body.

19. A tandem type brake booster as recited in claim 16, wherein
said groove is formed as discrete groove segments spaced circumferentially about said small diameter portion of said valve body; and
said engaging means of said retainer is further operable for preventing rotation of said retainer relative to said valve body and comprises a tubular portion of said retainer fitted about a portion of said small diameter portion and having discrete deformed portions respectively aligned with and protruding into said discrete groove segments of said small diameter portion.

* * * * *